United States Patent
Winkler

(10) Patent No.: US 9,309,051 B2
(45) Date of Patent: Apr. 12, 2016

(54) SYSTEM AND METHOD FOR ORDER PICKING

(76) Inventor: Walter Winkler, Parkstein (DE)

( * ) Notice: Subject to any disclaimer, the term of this patent is extended or adjusted under 35 U.S.C. 154(b) by 1056 days.

(21) Appl. No.: 12/752,481

(22) Filed: Apr. 1, 2010

(65) Prior Publication Data

US 2010/0262278 A1 Oct. 14, 2010

(30) Foreign Application Priority Data

Apr. 1, 2009 (DE) .......................... 10 2009 002 110
Mar. 11, 2010 (DE) .......................... 10 2010 015 935

(51) Int. Cl.
*B65G 1/137* (2006.01)

(52) U.S. Cl.
CPC .................................. *B65G 1/1378* (2013.01)

(58) Field of Classification Search
USPC .............. 53/445, 238, 168; 414/791.6, 796.2, 414/279
See application file for complete search history.

(56) References Cited

U.S. PATENT DOCUMENTS

| | | | |
|---|---|---|---|
| 5,269,646 A * | 12/1993 | Focke | 414/796.2 |
| 5,286,157 A * | 2/1994 | Vainio et al. | 414/273 |
| 5,411,151 A * | 5/1995 | Sasada | 209/583 |
| 5,636,966 A * | 6/1997 | Lyon et al. | 414/791.6 |
| 5,903,464 A * | 5/1999 | Stingel et al. | 700/215 |
| 5,953,234 A * | 9/1999 | Singer | B65G 1/0485 414/789.6 |
| 5,996,316 A * | 12/1999 | Kirschner | 53/443 |
| 6,061,607 A * | 5/2000 | Bradley et al. | 700/216 |
| 6,377,867 B1 * | 4/2002 | Bradley et al. | 700/216 |
| 6,425,226 B1 * | 7/2002 | Kirschner | 53/445 |
| 6,450,751 B1 * | 9/2002 | Hollander | 414/268 |
| 6,729,836 B2 * | 5/2004 | Stingel et al. | 414/791.6 |
| 7,097,045 B2 * | 8/2006 | Winkler | 209/630 |
| 7,110,855 B2 * | 9/2006 | Leishman | 700/216 |

* cited by examiner

*Primary Examiner* — Kaitlin Joerger
(74) *Attorney, Agent, or Firm* — Price Heneveld LLP

(57) ABSTRACT

An order-picking installation, a method for order picking and an order-picking system for the purpose of fully automated repacking of stock-keeping units from an inbound unit having a plurality of identical stock-keeping units into an outbound unit having a plurality of different stock-keeping units. The installation, method and system includes a separating station for separating the stock-keeping units, which are delivered in an inbound unit composed of a plurality of identical items, into stock-keeping units and/or sub-units of several stock-keeping units, a small-parts store including a storage location for each type of stock-keeping unit, with an item-storing position and an item-retrieval position, and a stacking and/or packaging station for assembling different stock-keeping units and/or sub-units in an outbound unit.

22 Claims, 11 Drawing Sheets

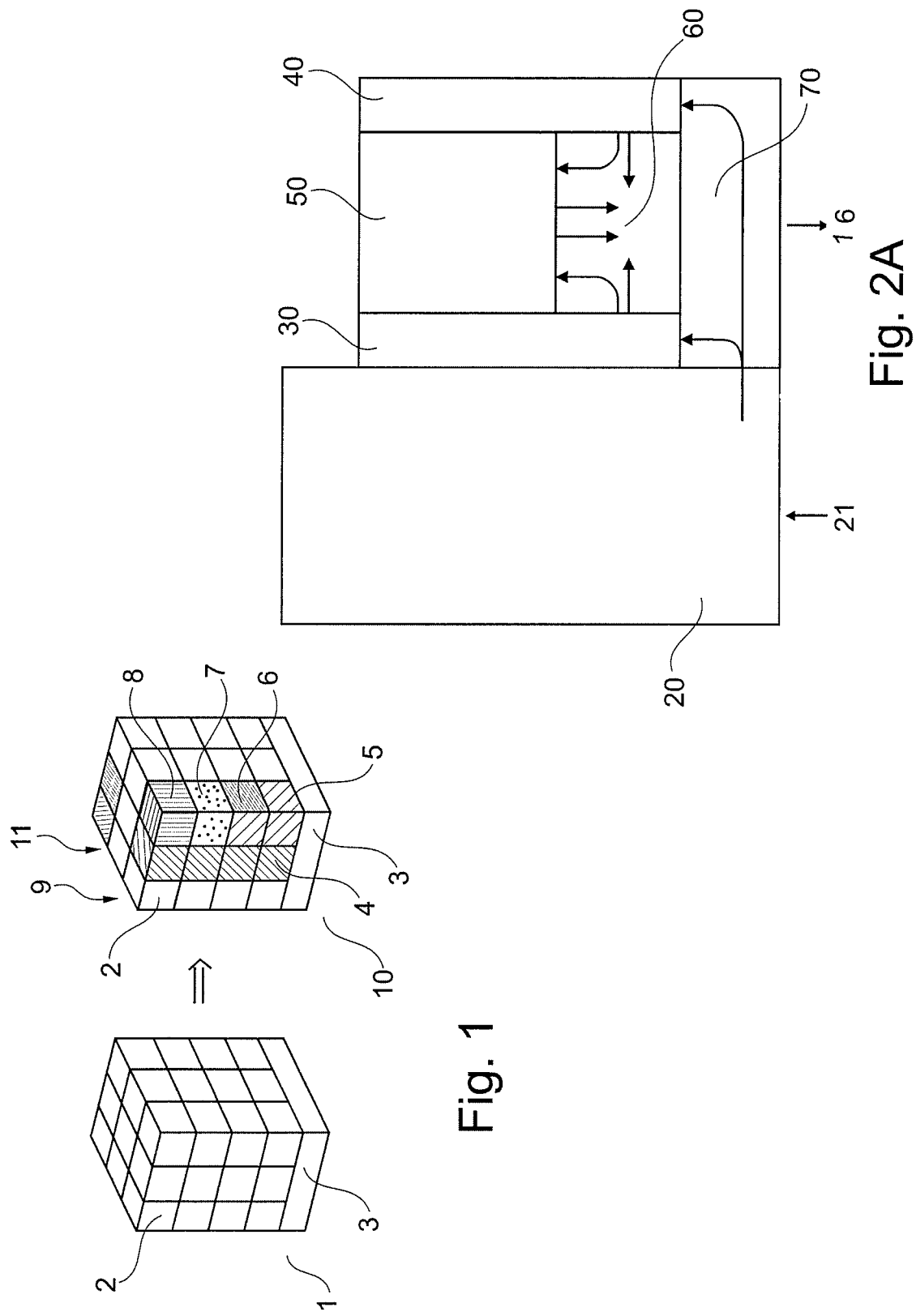

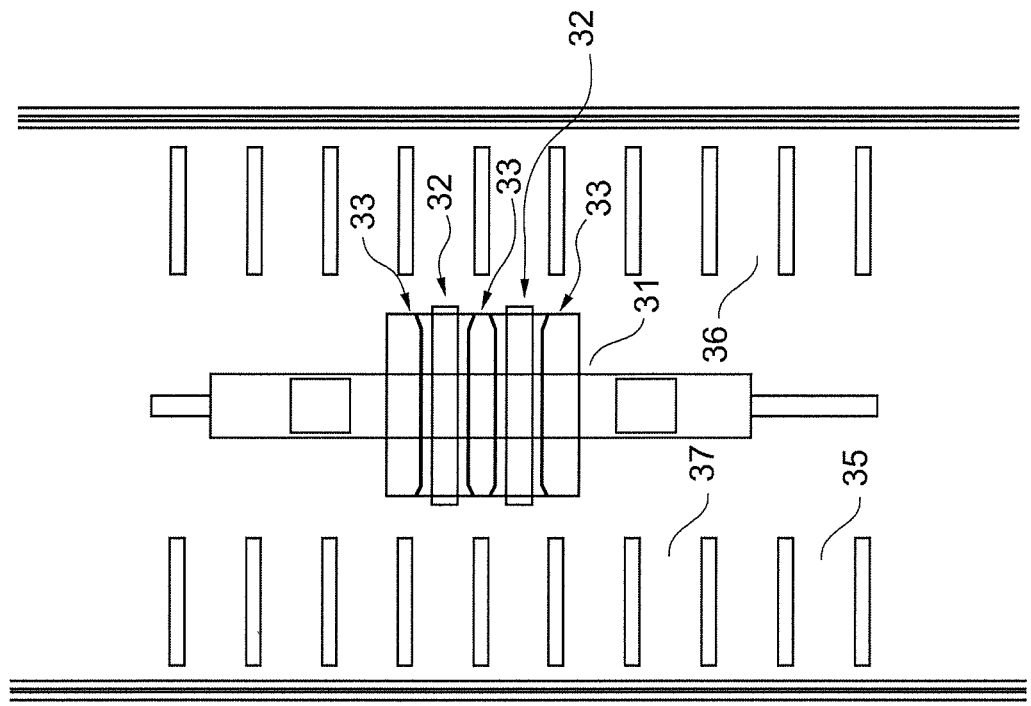
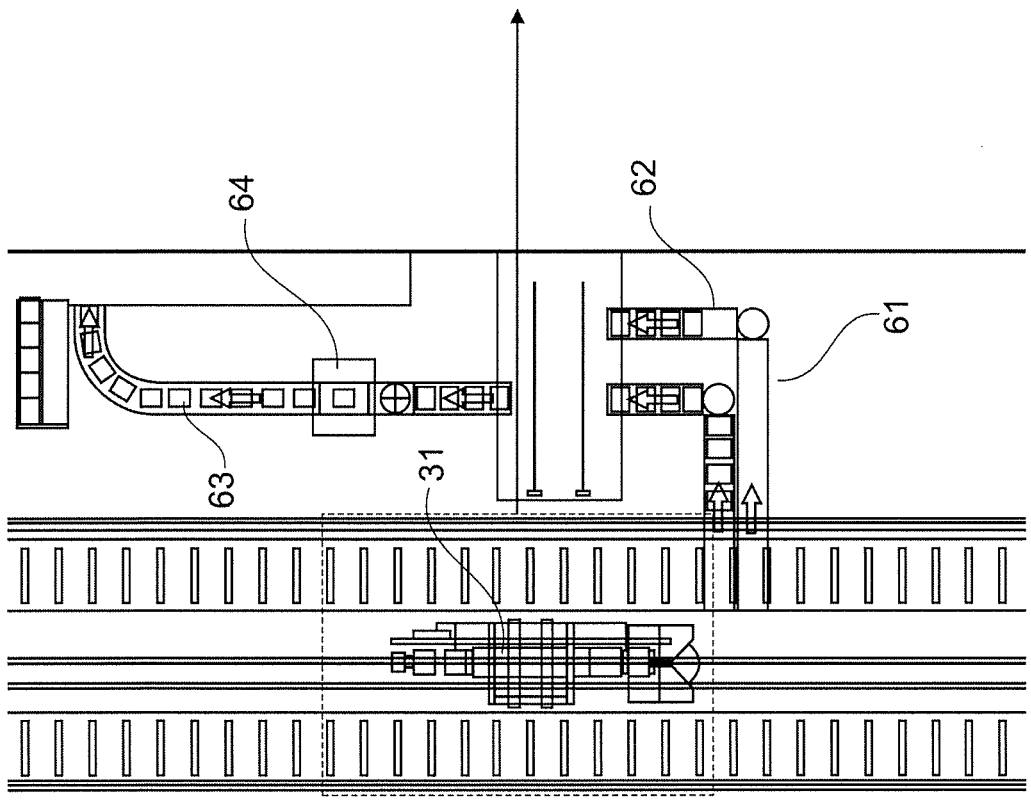
Fig. 4B
Fig. 4A

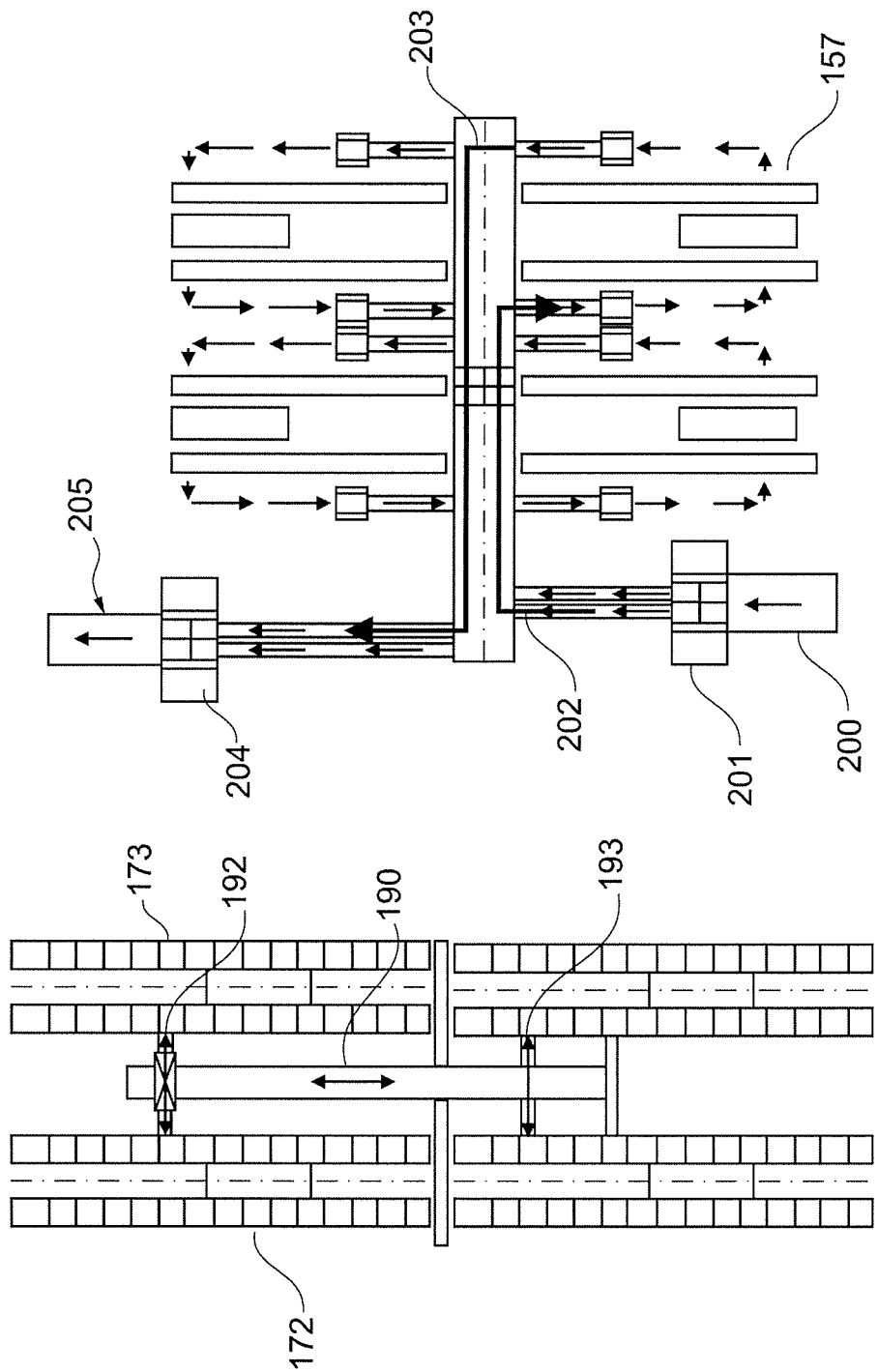

SYSTEM AND METHOD FOR ORDER PICKING

FIELD OF THE INVENTION

The present invention relates to an installation and a method for order picking.

BACKGROUND OF THE INVENTION

In the retail trade, items are usually bought in bulk for delivery to a central warehouse. From this central warehouse, the items are then distributed to individual retail branches or retail stores. For this purpose, the items, shipped by the manufacturer to the central warehouse in large shipment or packaging units of single-type items, must be repackaged into shipping or packaging units which are smaller and/or composed of mixed items for transport to the retail stores or retail branches. The shipping or packaging units of single-type items that are delivered to the central warehouse are therefore hereinafter referred to as inbound units, while the mixed assembled items leaving the central warehouse in the direction of the retail outlets are called outbound units. The aforementioned process of repacking and assembling items, which is commonly known as order picking, thus comprises the unpacking of an inbound unit of single-type items and the assembling of different items to form an outbound unit. The following description thus relates more generally to any process in which operations resembling order picking have to be performed.

The example of returnable beverage crates affords a simple way of illustrating the process of order picking. A brewery, for instance, delivers its various beverages, sorted by type, on standardized euro pallets, its smallest shipping or packaging units, as an inbound unit. Such an inbound unit is too large for delivery to retail stores, since the retail stores or branches have neither enough storage space for correspondingly large amounts of one type of beverage nor sufficient sales of the corresponding beverages that would render it profitable to store large quantities of different varieties of beverages. Thus, stocks of a single type of a returnable beverage in retail grocery stores are often limited to a few crates of that type. Accordingly, somewhere in a central warehouse for supplying the retail grocery stores or branches with an inbound unit (e.g., in the form of a standardized euro pallet), mixed types of beverages have to be assembled on the standardized euro pallet. Hitherto, it was customary to manually re-stack the pallets. This entails breaking the single-type pallet stacks in the central warehouse and assembling individual pallet stacks for individual stores or branches to suit their needs. Due to the great weight of the beverage crates, this is hard physical work, which also incurs a high personnel and organizational burden.

Automated order picking of returnable beverage crates has failed so far because returnable beverage crates are hard to identify. The lack of identifiability results from the fact that the distinguishing features mostly relate to the beverage manufacturer only, and not to the different types of beverages which the beverage company offers in single-type beverage crates. Thus, while the returnable beverage crates usually bear the name of the beverage company and are decorated in the manufacturer's typical color, the beverage crates themselves bear no information concerning these beverages because the crates are intended to be used for various types of beverages. On account of the multiple distribution channels and the swapping of returnable beverage crates among numerous different market participants, the attachment of a clearly identifiable marking is very difficult because it is necessary to ensure that a beverage crate which makes several rounds with different types of beverages always bears just one correct marking. This gives rise to the problem that either not all previously attached identifying markings are 100% removed or the effort involved in 100% replacement of the identifying markings is very high.

SUMMARY OF THE INVENTION

An aspect of the present invention is to provide an installation or a method in which items are sorted automatically from inbound units (e.g., pallet stacks) into a small-parts store, also called an automated small-parts store ("SPS"), wherein the item (stock-keeping unit ("SKU")) stored in each storage location of the small-parts store is known. The small-parts store, which comprises all the various SKUs that must be handled by the system, serves the purpose of assembling picked (mixed) outbound units (e.g., pallet stacks). Apart from the usual pallet stacks, double-deck pallets, rolling containers and other forms of outbound units composed of different items can be assembled or processed as inbound units.

By small-parts store in the present application is understood a store in which the corresponding racking or storage locations are used to store items in the manner in which they will be delivered individually to the addressee (e.g., a retail store). Accordingly, these items may be individual objects or corresponding packaging units, in which several items are packed together. Such a packaging unit, which can also be referred to as a sales unit, will also be described in the present application as an SKU, since it is delivered in this smallest packaging unit to the addressee.

The small-parts store can be designed as an automated small parts store ("SPS"), wherein the SKUs are stored in corresponding storage locations. In the automated small-parts store, picking and putting of SKUs in storage locations is fully automated. For example, for this purpose, if the automated small-parts store is constructed with corresponding racking, for example in the form of a high rack store, corresponding rack vehicles are used, which can traverse along the racking of the small parts store. These rack vehicles, which can also be called rack-operating devices or picking mini-loads ("PMLs"), can store SKUs or at least a part thereof in the SPS and retrieve them again from there. In the following, the general term store-operating devices will be employed, since an aspect of the present invention and the corresponding small-parts stores are not limited to storage racks, but can be used for all forms of storage.

As mentioned above, by SKUs is meant a single item, such as a case or a beverage crate. In the example of the beverage crate, however, it contains a number of beverage containers, such as bottles, such that it becomes clear that SKU in the present case refers to the packaging or sales unit in the form of a beverage crate. The term SKU can thus be understood to be any object which is shipped as a single manageable shipping, packaging and sales unit to the addressee (e.g., a retail store).

When delivered to a central warehouse, the SKUs are already grouped together as large entities (e.g., on a standardized euro pallet, on a rolling container or any other suitable load carrier). Such an entity of grouped SKUs which are delivered and therefore contain single-type SKUs shall, as defined above, be called an inbound unit, while an assembly of picked items (i.e., an entity composed of different SKUs), shall be called an outbound unit.

In addition to storage on different load carriers, such as pallets, rolling containers, etc., the inbound unit and the outbound unit can be grouped together in all kinds of ways to form a single entity (e.g., by means of shrink-wrap film, wrapping film and the like).

In an aspect of the present invention, materials handling is used to move the SKUs in the installation (e.g., a first handling section from a depalletizing and/or destacking station (separating station), in which the SKUs are removed from the inbound unit and/or separated, to the small-parts store, and a second handling section from the small-parts store to the stacking and/or packaging station (palletizing station), in which the outbound unit is assembled from the various SKUs). The materials handling can comprise elements of continuous materials handling and discontinuous materials handling. Under continuous materials handling is meant movement of the SKUs in a continuous process (e.g., via a circulating conveyor belt, a roller conveyor and the like), while discontinuous materials handling elements are taken to mean discontinuous, sequential movement with discrete steps, such as cross-pushing cars. Both types of materials handling can be used in the present invention, whereby, from one aspect of the invention, a first handling section from a separating station to the small-parts store and/or a second transport section from the small-parts store to the stacking and/or packaging station has a forced guidance of the items, wherein a single transport route is predefined which the items are forced to take, without decisions having to be made about the section to be traveled, and without there being any overtaking and the like. The handling sections may be divided into sub-sections.

The SKUs moved by the materials handling can be monitored (e.g., as an alternative to forced separation or additionally as they are being moved), such that it is possible to establish which items are moving where. This is also known as target tracking. A fundamental distinction is made in this regard between at least indirect target tracking and direct target tracking. In direct target tracking, which can be avoided in an aspect of the present invention, the SKUs which are being moved are identified directly by corresponding detection stations, such that corresponding identification stations are arranged along the travel route or the handling section for facilitating direct and immediate identification of the transported SKUs. This can proceed by means of, for example, bar codes, RFID (radio frequency identification) tags, through image or pattern recognition of photographs of the items or measurement of other properties of the items, such as their weight. To this end, the detection stations receive, as a result of physical measurements, information about the items to be identified or to be directly tracked and so information (e.g., about the nature of the item, item name, size, etc.) is transmitted or logged. Direct target tracking entailing correspondingly more elaborate detection and identification of the moved items and the associated error-proneness is not necessary. Instead, an aspect of the present invention makes do with indirect target tracking (for example, that which is based purely on information technology and/or only one counter when the transport route provides for the forced guidance of the items on a single path).

In indirect target tracking, as opposed to direct target tracking, there is no need for direct identification of the SKUs by identification stations or systems; instead the information about the identity of a given item is passed to the system at a specific starting point (e.g., upon delivery of the inbound unit), and the system receives the information that the item will be sent to a specific target address. All that is established is that some object has passed through the corresponding handling section or has reached the goal, and that it must therefore be the corresponding item that had been sent. Thus, there is no need for direct identification by detecting a specific code or directly transmitting information between a detection station and the item, a fact which, in the case of poorly identifiable items may be impossible. All that is needed for this is sensors which indicate the passage of an object or the arrival of an object (e.g., light barriers, stop elements and the like).

The handling sections can be kept very short (e.g., in a length range of less than or equal to 15 m or less than or equal to 10 m).

The use of a small-parts store makes it possible to provide the items needed for assembling a picked outbound unit directly from the small-parts store with defined storage locations for the various items and to merge them into an outbound unit (e.g., to form a pallet stack). Through the direct, immediate storage of delivered single-type items in the small-parts store and the direct and immediate assembling of the mixed or picked outbound unit from the small-parts store, it is not necessary to have direct target tracking of the items by a system for logging or identifying the type of items, whether during storage in the small-parts store or during retrieval from the small-parts store (i.e., during the entire order-picking process). In the case of order picking of returnable beverage crates (e.g., onto an EU pallet or a rolling container), all the requisite types of beverages are specifically requested from the known storage locations in the small-parts store and are transported direct from the small-parts store, without branching points or merging on the transport route, to a stacking (stacking station) and/or packaging station, which stacks and/or palletizes the SKUs to form the pallet stack for the outbound unit (i.e., arranges them on a pallet (palletizing station and, in the extended sense, a packaging station) and/or packages them in any other way (packaging station), such that elaborate logging systems for the type of item and corresponding direct target tracking can be dispensed with). The stacking and/or packaging station can be realized by separate apparatuses or by a single integrated apparatus, with the term packaging station being used very generally, such that it includes a pure palletizing station, regardless of whether other packaging, such as wrapping film or shrink-wrap film and corresponding integrated or separate apparatuses are provided therefor.

According to a further aspect of the present invention, the single-type inbound units can be sorted fully automatically in a small-parts store, in which the storage locations for the individual SKUs are known. From this small-parts store, the various SKUs which are assembled to a mixed outbound unit (e.g., in the form of standardised a standardized euro pallet), are also retrieved fully automatically from the known storage locations and are assembled directly to form the outbound unit, such that there is no need to identify the individual items en route from their storage location in the small-parts store to the packaging or stacking station to form an outbound unit. The transport route from the depalletizing station for the single-type items delivered to the small-parts store and from the storage location in the small-parts store to the palletizing station for the picked items has no branches or merging points on the transport path, which would necessitate elaborate tracking and identification of the items in the form of direct target tracking. Instead, the transport path is structured so as to be compact and short, both from the depalletizing station for the single-type items into the small-parts store as well as from the small-parts store to the palletizing station for the picked items, such that accordingly there is no need for direct target tracking of items through elaborate identification systems employing optical systems or weight determination, and the like.

Correspondingly, according to a further aspect of the present invention, the corresponding order-picking installation can be designed such that the small-parts store has all or at least a predominant portion of the items in stock which are to be handled by the installation or the system, such that, in the simplest case, a single rack-operating device or store-operating device can be used to retrieve all items from the small-parts store. In this way, a picked outbound unit can be assembled on the sole basis of the information about the storage location of the various items, since a single store-operating device can retrieve the items from the known storage locations and assemble them directly for the outbound unit or make them available therefor, without the various items from different storage locations employing different store-operating devices having to be merged at some point. There is no need to identify the items during transport between the storage location and the stacking and/or packaging station if all the items for assembling an outbound unit are retrieved from a single small-parts store and are transferred at a common transfer point for the stacking and/or packaging station. Accordingly, at the transfer point, only the number of items for the outbound unit can be checked, not the identity of the individual items.

It is in principle also conceivable for the small-parts store to have multiple store-operating devices and/or small-parts store sections that cover all or most of the range of items to be handled (i.e., provide the opportunity to retrieve all the items for one outbound unit). In that event, the interacting store-operating devices and racking sections can be coordinated with each other to the extent that together they process one order for one outbound unit and assemble the corresponding items at a clearly defined transfer point for the stacking and/or packaging station. Where there are only a few combined warehouse sections and/or store-operating devices, sole informational monitoring of the items to be assembled (i.e., securing the knowledge of the momentary position of the various items), is still manageable without the need for elaborate identification or detection measures. However, it is possible to provide, where possible, just one, two or three store-operating devices for retrieving the items from the small-parts store containing the full range of items to be handled (e.g., in the form of two opposing racks with a single rack-operating device lane between them), such that, on the assigned transport path(s) from the small-parts store to the station(s) for assembling the picked outbound unit, it is clear which items are currently being transported, without any identification having to be made.

However, it is possible to build larger modular installations that have multiple modules, each with a complete small-parts store and one or more stations for storing (depalletizing station for the delivered single-type items with transport path to the small-parts store) and retrieval (transport path from the small-parts store to the palletizing station for the picked items).

The same store-operating devices that are used for retrieving the items from the small-parts store can also be used to store the items in the small-parts store, with the possibility of boosting capacity by providing additional store-operating devices for storing the items in the small-parts store.

From the description above it is clear that, according to a further aspect of the present invention, pure informational monitoring of the items occurs from retrieval of the items in the small-parts store to assembly of the mixed or picked outbound unit. This means that the very knowledge of the storage location of each item in a small-parts store, and the corresponding action to retrieve the desired items and forward them to the stacking and/or packaging station for the purpose of forming the mixed outbound unit ensure that the desired items are present as ordered in the mixed or picked outbound unit. Since there is no provision for merging and/or separating the streams of items in the transport chain during storage of the items in the small-parts store and during retrieval of the items from the small-parts store through to the merging in the picked outbound unit, logging or identification apparatuses for the various items on the transport route can be dispensed with. All that is necessary is to provide simple monitoring units, such as counters (e.g., light barriers and the like), which establish only whether an item is on the transport path or where the item is located, without the need for these monitoring units to establish the identity of the items. This can substantially simplify the order-picking apparatus or installation.

By pure informational monitoring it is therefore meant that only that information which is stored initially in the order-picking installation or the order-picking system and which relates to the storage location of a single item in the small-parts store is used to insert the SKU as needed into an outbound unit, without the need to perform interim identification or detection of the item. As a result of the simple and short transport paths, simple indirect target tracking is possible, which merely comprises a system for logging of the SKUs without detection or identification (e.g., counters, occupancy sensors, or light barriers and the like).

From a further aspect of the present invention, the efficiency of the method or the apparatus can be improved by providing so-called tower storage. Since the delivered single-type inbound units (e.g., in the form of the single-type stacks of items on European standardized pallets) provide for several SKUs to be stacked on top of each other and side by side, and, in the picked outbound unit, again corresponding SKUs are stacked in similar form on top of each other and side by side, sub-units of the SKUs (e.g., a row of items lying side by side and/or a tower of items stacked on top of each other can be treated as a sub-unit), without it being necessary to break the sub-unit since this sub-unit in the form of a tower and/or row can be stored direct in a picked outbound unit. Accordingly, in addition to a small-parts store in which the items are accordingly stored individually or separately from each other in their smallest retail packaging unit (see above), an aspect of the present invention provides for so-called tower storage or sub-unit storage, which can store corresponding sub-units, such that these sub-units can be transported directly from the sub-unit storage or tower store for the purpose of forming a picked outbound unit, without the need to break and disassemble the sub-unit and to store the items in the small-parts store. The sub-units or the sub-unit storage therefore allow for the storage and/or the transport of several SKUs as a unit. This enables the effectiveness of a corresponding order-picking installation or a corresponding system to be substantially improved. Accordingly, the materials flow in such a system proceeds not, as in the previously described variant, from the pallet storage containing the delivered single-type inbound units directly to the small-parts store, but rather from the pallet storage to the tower store, and from the tower store, at least in part, directly to the small-parts store and/or, at least in part, directly to a stacking or packaging station for the purpose of forming a picked outbound unit (e.g., to a palletizing station for palletizing the mixed item pallets).

By stacking or packaging station it is therefore generally meant an apparatus in which several SKUs are assembled into a sub-unit composed of several SKUs, and/or several SKUs and/or sub-units composed of SKUs are assembled into an outbound unit (i.e., stacked (e.g., placed side by side on a transport carrier, packaged together and/or palletized on a pallet)). Accordingly, the stacking and/or packaging station can be formed by separate or combined stacking apparatuses, palletizers, further packaging apparatuses, such as apparatuses for film wrapping and the like.

Although the small-parts store and the tower store or the sub-unit storage can be separated from each other locally, it is also possible to mix the different types of storage, since the storage locations can be labelled informationally (i.e., the system knows where the items are stored and in what form).

Also, where single-type sub-units, composed of several SKUs, are fed as towers of items or rows of items to the stacking and/or packaging station for the purpose of forming mixed outbound units, the route is as immediate and direct as possible, more precisely has no additional branches, junctions, merging, and the like, such that it is possible to monitor that the right items are assembled in the picked inbound unit, again largely purely informationally, especially without detection or identification systems. As a result, elaborate systems for direct tracking or identification and logging/detection devices can be dispensed with.

In addition, the store-operating devices or rack-operating devices can be designed such that they can transport corresponding sub-units or several SKUs simultaneously, such that the efficiency and versatility are improved.

An aspect of the system or the underlying methods and the corresponding apparatuses or installations lend themselves ideally to order picking of returnable beverage crates, in the case of which it is difficult and laborious to identify the type of beverage located inside the corresponding beverage crates. Apart from the returnable-beverage crates, however, all other items with or without packaging, which are not easily identifiable, can be treated in accordance with the corresponding system. For example, fresh produce, such as fruit, vegetables, meat and fish, can be order-picked particularly into corresponding containers, with the containers capable of having different dimensions.

By virtue of the fully automated storage and retrieval of the items in the small-parts store and/or sub-unit store, as well as the order picking of corresponding outbound units, the method is suitable for items that need to be handled at certain temperatures, such as frozen food and the like, since the fully automated method dispenses with staff and can thus be operated at low temperatures. In addition, heavy items can be processed at high throughput, since this is not limited by the load-bearing capacity of a human worker.

The modular design enables any demands on the volume throughput of items to be met in a simple manner, since several modules can be combined.

Due to the very short materials handling from the depalletizing station (separating station) for the single-type items (inbound unit) to the small-parts store and/or sub-unit storage and from the small-parts store and/or sub-unit storage to the palletizing station (stacking and/or packaging station) for the picked items (outbound unit), not only can the need for elaborate detection or identification systems be avoided, but the error-proneness of branching and merging or inter-sections, which can be dispensed with, is likewise eliminated. In addition, the space requirement is low because the small-parts store can be designed as a high-rack store. Thanks to the compact design, the entire installation can be operated at certain temperatures as well (e.g., for frozen food).

The monitoring of all movements of the store-operating devices, both on the part of the control technology and on the part of information technology, 100% error-free tracking of the materials flow through the entire system is possible, without the need for using elaborate identification systems. Especially, there is no need for the individual containers or items to be marked (e.g., physically marked, with barcodes and the like). This not only can eliminate labelling, but also in turn can lead to the avoidance of errors that could conceivably arise from damaged means of marking, such as barcodes and RFID (radio frequency identification) tags. Identification of the items can occur just once and centrally when the single-type stack of items is fed into the system at a corresponding separating station (depalletizing station). Subsequent identification is unnecessary since the installation system has always stored the precise location of a specific item, and the design of the system and transport routes rule out the possibility of malpositioning.

Due to the compact design of the materials handling, very energy-efficient operation, such as in the case of heat-sensitive items, such as frozen food and the like, is possible, since only a very small area needs to be kept at the corresponding temperature.

BRIEF DESCRIPTION OF THE DRAWINGS

Further advantages, characteristics and features of the present invention are apparent from the following detailed description of embodiments using the enclosed drawings. The diagrams show in purely schematic form.

FIG. 1 is a perspective view of order picking (i.e., the conversion of a single-type inbound unit in the form of a pallet stack to a mixed outbound unit);

FIG. 2A is a plan view of an entire installation in accordance with the invention;

FIG. 4A is a partial view of the tower store from FIGS. 2 and 3;

FIG. 4B is a partial view of a rack-operating device of the tower store from FIG. 4A;

FIG. 10 is a side view of a detail of the order-picking installation from FIG. 9; and FIG. 11 is an embodiment of the operating flow of the order-picking installation from FIG. 9.

DETAILED DESCRIPTION OF AN EMBODIMENT

Figure 2C:
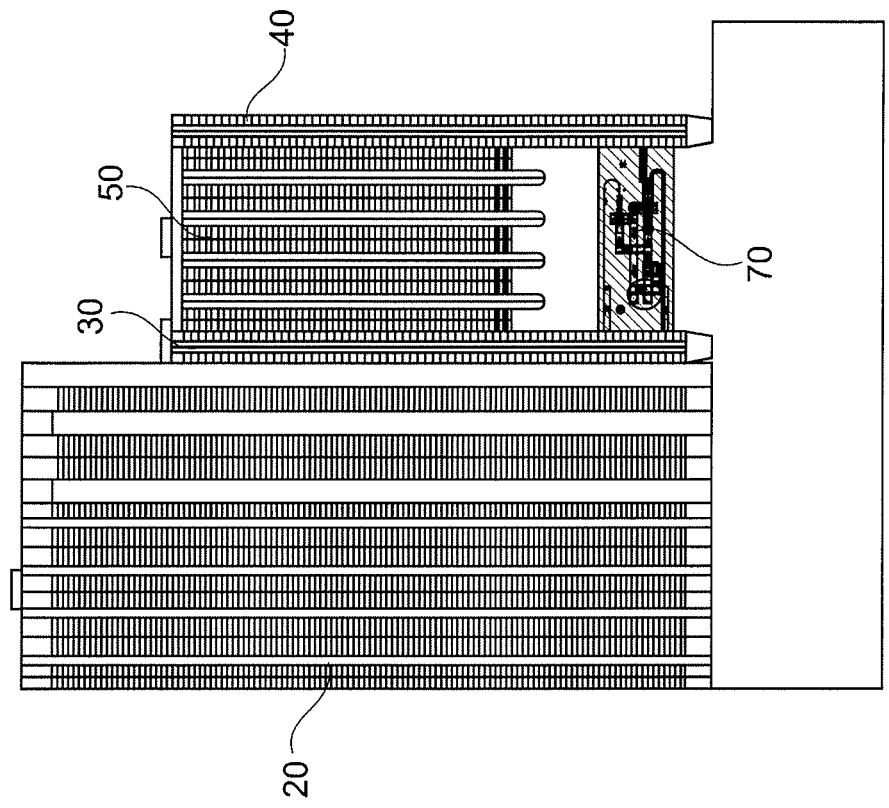
FIG. 2C is a plan view of a second level of the overall installation from FIG. 2A.

FIG. 1 shows a perspective view of two pallet stacks comprising an inbound unit 1 and an outbound unit 10, with the unbound unit 1 being on a pallet 3 (e.g., a standardized euro pallet), containing only single-type SKUs 2, and thus representing an inbound unit into a central warehouse, for example, of a retail chain. The SKU 2, which in turn can comprise smaller packaging units, is the smallest packaging unit, which is treated in the central warehouse in line with the system for order picking.

Although retail stores (e.g., the branches of the retail grocery store chain and the like) are supplied also in larger packaging units that may differ from or are identical with the inbound unit 1 (see outbound unit 10 of FIG. 1), these outbound units from the central warehouse can be assembled with different items because the demand in retail stores for a particular type of item in retail stores is not as large as the corresponding packaging unit and there is not enough storage space available. Accordingly, the outbound unit 10 comprises different items 2, 4, 5, 6, 7, 8, which in turn are stacked on a pallet 3. Instead of a pallet 3, a rolling container or other transport means could be chosen for packaging units, or the packaging unit could be assembled without additional pallet and the like.

Within the outbound unit 10, for example, many similar items 2 or 4 may be provided, such that towers 9, 11 of similar items can be formed. For example, the tower 9 can comprise four SKUs 2 stacked above each other. Accordingly, it is not necessary in the case of inbound unit 1 to separate all items and/or individual SKUs 2 from each other, but rather sub-units in the form of towers 9, 11 can be formed that can be transferred direct to the outbound unit 10. As a result, the effort needed for separating (destacking) and assembling (stacking) can be greatly reduced.

FIG. 2A shows a plan view of a corresponding installation for order picking. The installation comprises a so-called pallet storage 20 into which are delivered the single-type inbound units 1 from the item manufacturer (e.g., pallets of a certain type of beverage from a beverage producer (e.g., a brewery)). Delivery is symbolized by the arrow 21. The single-type inbound units 1 (e.g., the stack of beverage crates containing one type of beverage), can be temporarily stored in the pallet storage 20. From there, they are transported into a tower storage apparatus 70, where, in a depalletizing station (first separation station), they are separated from the pallets and then further separated into corresponding sub-units, such as towers. The sub-units in the form of towers 9, 11 are stored in the tower stores 30 and 40 as single-type sub-units by means of a rack-operating device, with the storage locations being logged and stored informationally, such that it is known which items are stored in which storage locations of the tower store 30, 40. The towers correspond to a single stack on a pallet and are transported and stored as a unit. Informational monitoring and control as well as electronic storing of the storage locations is taken on by a data processing system equipped with suitable software. From the tower stores 30, 40, the sub-units (towers) are separated into the SKUs 2 via an order-picking apparatus 60 (second separating station) and stored in a small-parts store 50 and/or directly transferred to a picked outbound unit, as is also shown by the arrows.

The order-picking apparatus 60 also serves the purpose of transferring the items stored in the small-parts store 50 to the picked outbound units. The finished, picked outbound units are released again from the installation for the purpose of supplying the retail stores or branches, as indicated by the arrow 16.

Figure 2B:
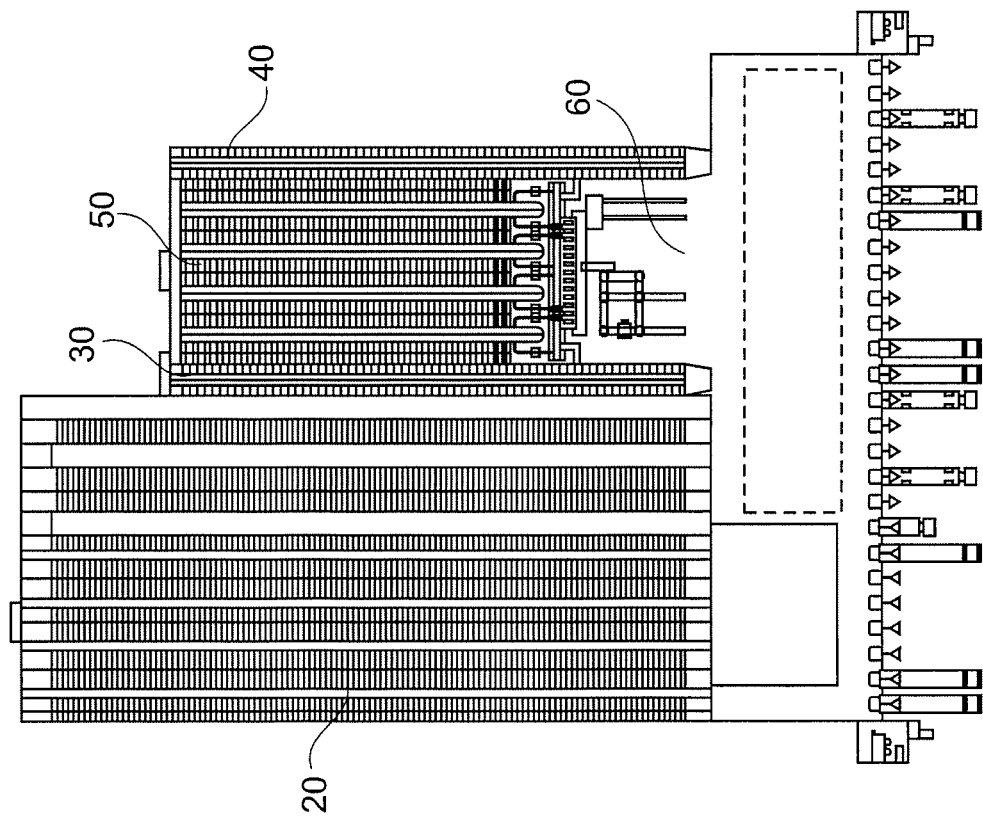
FIG. 2B is a plan view of a first level of the overall installation from FIG. 2A.

In FIGS. 2B and 2C, the full installation is shown once again divided into two levels, such that it is apparent that the tower storage apparatus 70 and the order-picking apparatus 60 are arranged in different levels.

Figure 3:
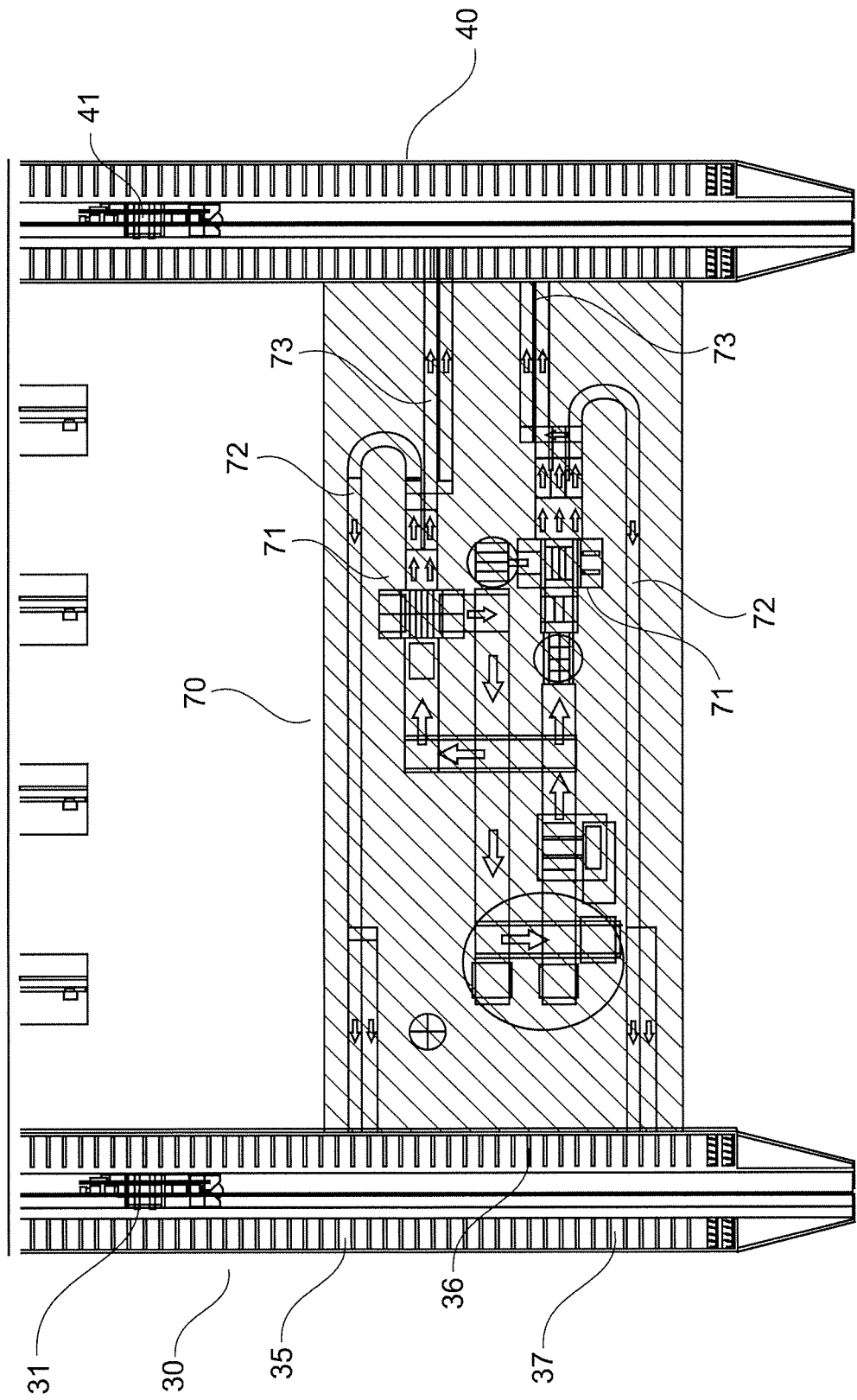
FIG. 3 is a detailed view of the tower storage apparatus from FIG. 2.

FIG. 3 shows the apparatus for depalletizing and storing the sub-units into the tower store 30, 40 (tower storage apparatus 70). The corresponding apparatus 70 comprises two pallet-removal apparatuses 71, in which the inbound unit 1 can be gripped via corresponding gripping apparatuses, such that the pallet 3 can be removed. The empty pallets are accordingly stacked and sorted by a stacking machine. The items of the pallet stack are transported in separated towers of SKUs stacked on top of each other via transport devices 72 and 73 in the direction of the tower stores 30, 40, which are located on both sides of the tower storage apparatus 70. Since rack-operating devices 31 and 41 of the tower stores 30, 40 can process towers in two rows, the transport devices 72, 73 are designed such that they branch into double lanes in order that the towers can be fed in two rows to the rack-operating devices 31, 41. The rack-operating devices 31, 41 receive the towers of items and store them in the corresponding tower store. Information technology is then used to record what type of item is being stored at which storage locations in the tower store 30, 40. From the information as to the type of item which has been transferred to the pallet-removal apparatuses 71 and the number of the resulting towers, unequivocal handling of all items can be performed, to the extent that it is known precisely which items are stored in the tower store 30, 40 and where, without major identification and monitoring systems. All that is needed is to provide simple control stations, such as counting stations in the form of light barriers and the like, along the transport devices 72, 73 to verify that the corresponding towers have been processed.

FIGS. 4A and 4B show the configuration of the rack-operating device 31 in detail. FIG. 4A shows the rack-operating device 31 in the area of the order-picking apparatus 60, which can be arranged in the installation (e.g., in a level above the tower storage apparatus 70), for depalletizing and storing the towers into the tower store. Because the rack-operating device can traverse along a level in the tower store 30 and 40, the rack-operating device can reach the various stations such as the order-picking apparatus 60 and apparatus 70 for depalletizing and storing in the various levels in the tower store as well as all the storage locations in the tower store.

FIG. 4B shows the rack-operating device, which can move freely in a central level between two racks within the level, such that all storage locations of opposing racks can be reached. The rack-operating device 31, which is shown as an example in FIG. 4B, has two separately controllable telescopic forks 32, which can accommodate a total of four towers one behind the other. For lateral stability, support walls 33 are provided along the telescopic forks. The telescopic forks can be extended transversely to the movement direction of the rack-operating device 31 in order to enter beneath the towers and thus to accommodate the corresponding towers. By means of the telescopic forks, the towers can then be stored in the storage locations of the tower store and retrieved from these again.

Figure 4C:
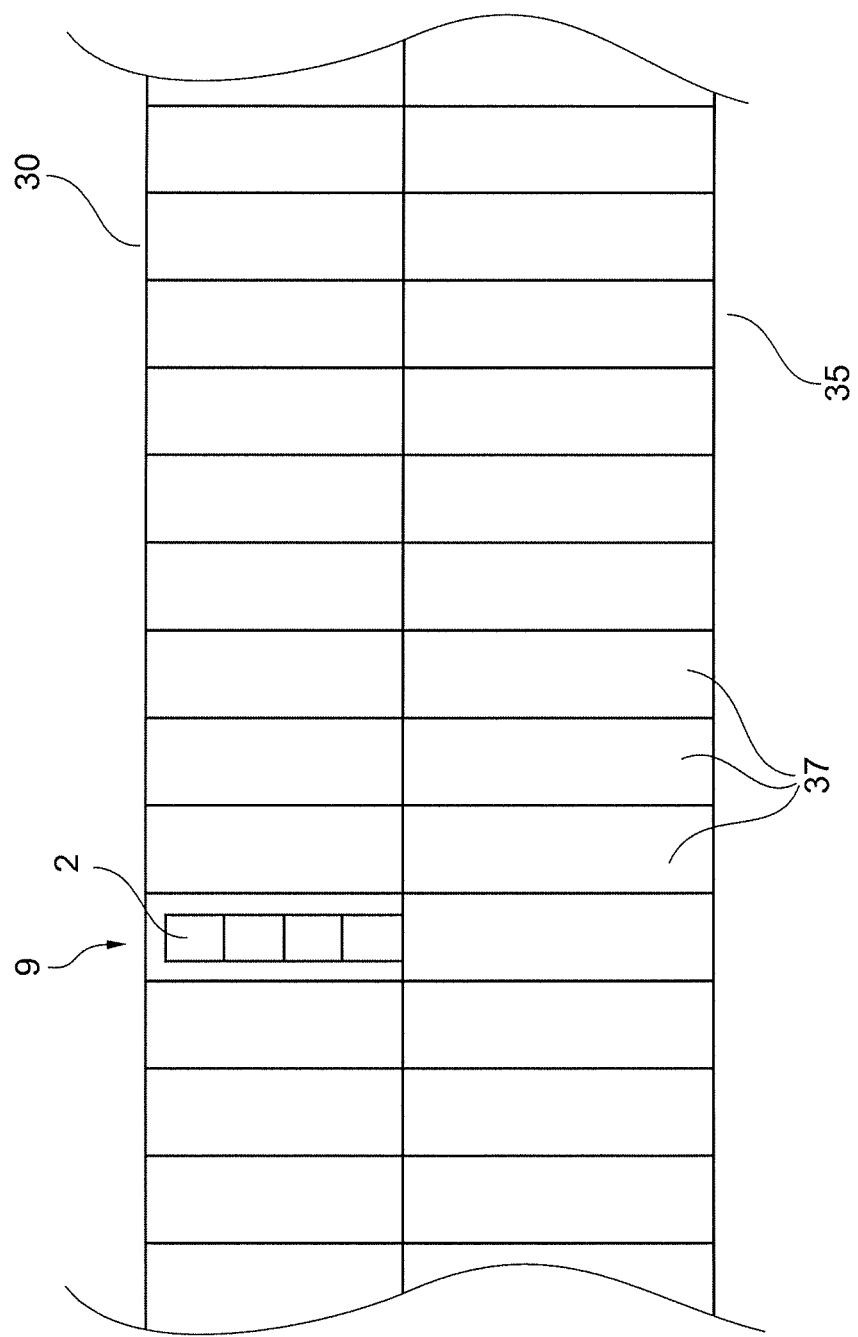
FIG. 4C is a partial view of a tower store from FIGS. 2 and 3.

FIG. 4C shows a partial side view of a storage rack 35 of the tower store 30. In the illustrated embodiment, a plurality of storage locations 37 are provided for single-type towers 9 of the SKUs 2, next to each other and in two rows on top of each other. Of course, it is also possible to arrange several rows on top of each other. In the individual storage locations 37, the towers 9 can also be stored horizontally behind one another. In the tower store 30, the sub-units are stored as single-type (i.e., only sub-units of the same SKUs 2 are stored in the storage locations 37) with, via the control system in the form of a data processing system with corresponding storage system, it being known what type of item is stored in specific storage locations 37, such that the rack-operating device can fetch certain items from the tower store when requested to do so.

Figure 5:
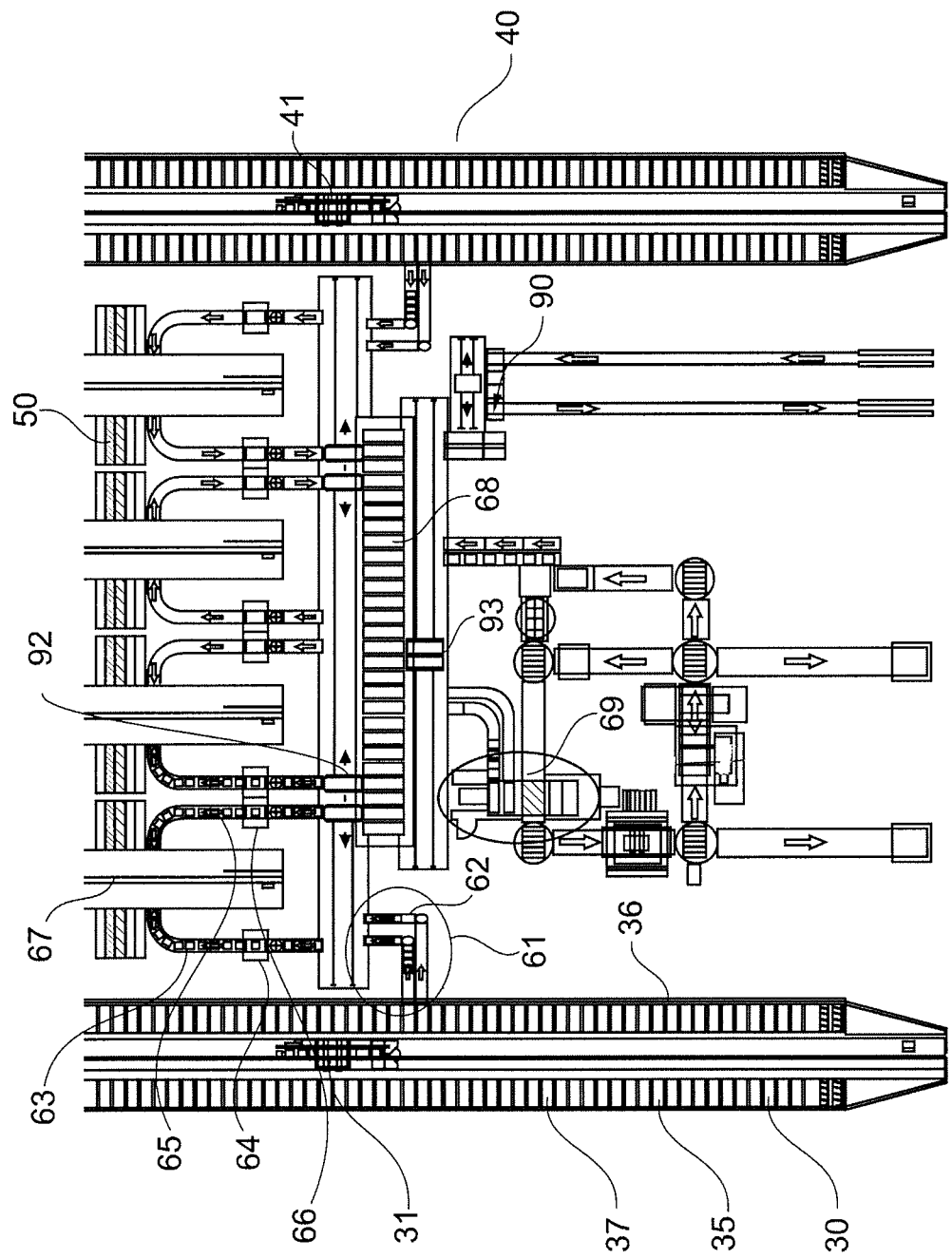
FIG. 5 is a detailed view of an order-picking apparatus.

FIG. 5 shows the tower stores 30, 40, the order-picking apparatus 60 and a section of the small-parts store 50. With regard to the tower stores 30, 40, individual racks 35, 36 are shown in the middle of which and along whose length the rack-operating devices 31, 41 may be moved. The rack-operating devices 31, 41 serve, as has been shown in connection with the tower storage apparatus 70 for depalletizing and storing the sub-units in the tower store, to store and retrieve the towers from the tower stores 30, 40. To retrieve the towers, the rack-operating device 31, 41 fetches those items from the storage locations of the tower store 30 which have been requested by the control system which is implemented as software in the data processing system and forwards the towers to a retrieval section 61 for the towers from the tower store 30. The retrieval section 61 is designed such that two transport routes 62, 63 can be used. The one transport route 62 leads the retrieved towers via the pushers 92 and 93 and the buffer zone direct to a palletizing apparatus 69, in which corresponding item towers for producing a picked outbound unit are arranged on a pallet, and/or to a loading station 90 for rolling containers, such that, in addition to loading of a pallet, the loading of rolling containers in the loading station 90 is possible.

The second transport route 63 for the towers leads the towers to the small-parts store 50 via a single destacking unit 64, whereby provided at the end of the transport route 63 is the item-storing position comprising the transfer of the SKUs to a rack-operating device 53. In the destacking unit 64, the stacked towers are separated into the SKUs 2, which are then stored separately in the small-parts store 50. To this end, the transport route 63 leads into the area of a movement level 67 of the rack-operating device 53 of the small-parts store 50. Since the item towers from the tower store 30 are single-type and the control system knows what type of items from the tower store 30 has been requested for storage in the small-parts store 50, defined storage of the items in the small-parts store 50 is possible without identification of the SKUs, such that the control system of the installation (e.g., a software-controlled data processing system) knows which items are stored in which storage location in the small-parts store 50.

For order-picking of the outbound unit in the form of a mixed-items pallet in the palletizing apparatus 69 or a mixed-items assembly for a rolling container in the loading station 90, to an extent depending on the number of individual items needed, the individual items in the small-parts store 50 are retrieved from the storage locations of the small-parts store via the rack-operating device 53 (see FIGS. 6A and 6B), and/or, where a number of items enables entire item towers to be integrated into the outbound unit, corresponding item towers can be transported direct to the palletizing apparatus 69 or the loading station 90 via the retrieval section 61 via the transport route 62. The towers in this regard are brought to the pusher 92 via the transport route 62, said pusher moving several towers together and thus capable of effecting a corresponding partial assembly of the items for the outbound unit. The pusher 92 can accommodate both item towers from the transport route 62 and item towers which are formed by a stacking unit 66. The stacking unit 66 is integrated into a single retrieval section 65 of the small-parts store 50, on which section the SKUs fetched from the small-parts store 50 by the rack-operating device 53 are transported to the stacking unit 66. The rack-operating device 53 delivers the SKUs at the item-retrieval position to the handling device of the retrieval section 65.

In the stacking unit 66, the SKUs are stacked to form a tower, which is transferred to the pusher 92. The corresponding towers are transported by the pusher 92 via a buffer zone 68 to the palletizing apparatus 69 and/or the loading station 90 for rolling containers, from where the corresponding picked outbound units are loaded onto trucks for delivery to retail stores or branches.

As is apparent from the illustration in FIG. 5, the order-picking apparatus is characterized by the fact that short routes exist and/or few items requiring monitoring are underway on the various transport apparatuses, such that monitoring can be done purely via stored information, and no identification units for the items need to be provided in the transport routes. This can be achieved by the fact that the various transport paths have no branches, junctions, or confluences that would necessitate identification of the items. Only in the case of the pusher 92 are towers from the tower store 30 or 40 and the small-parts store 50 or the stacking unit 66 merged directly.

As is further evident from FIG. 5, the order-picking installation comprises several small-parts stores 50 as modules with several rows of racks and several rack-operating devices, as well as several storage and retrieval sections that are served by the pusher 92. The various modules each comprising two racks and the different rack-operating devices are used primarily to increase the capacity of the entire installation, such that the modules can largely operate independently alongside each other. Only the pusher 92, the buffer zone 68 and the pusher 93 for operating the palletizing apparatus 69 and the loading station 90 for rolling containers are shared, but this is easy to handle from the point of view of information technology. Otherwise, for the purpose of simple informational monitoring of the assembly of the items to be picked, it is possible to use only one rack-operating device to retrieve all items to be handled in order that elaborate processes for merging different streams of items may be avoided. However, the small-parts store 50 can also be structured such that several rack-operating devices are provided per small-parts store or module and the various items are arranged in different sections, each with their own rack-operating device, and merging in the buffer zone 68 is informationally organized and monitored.

Figure 6:
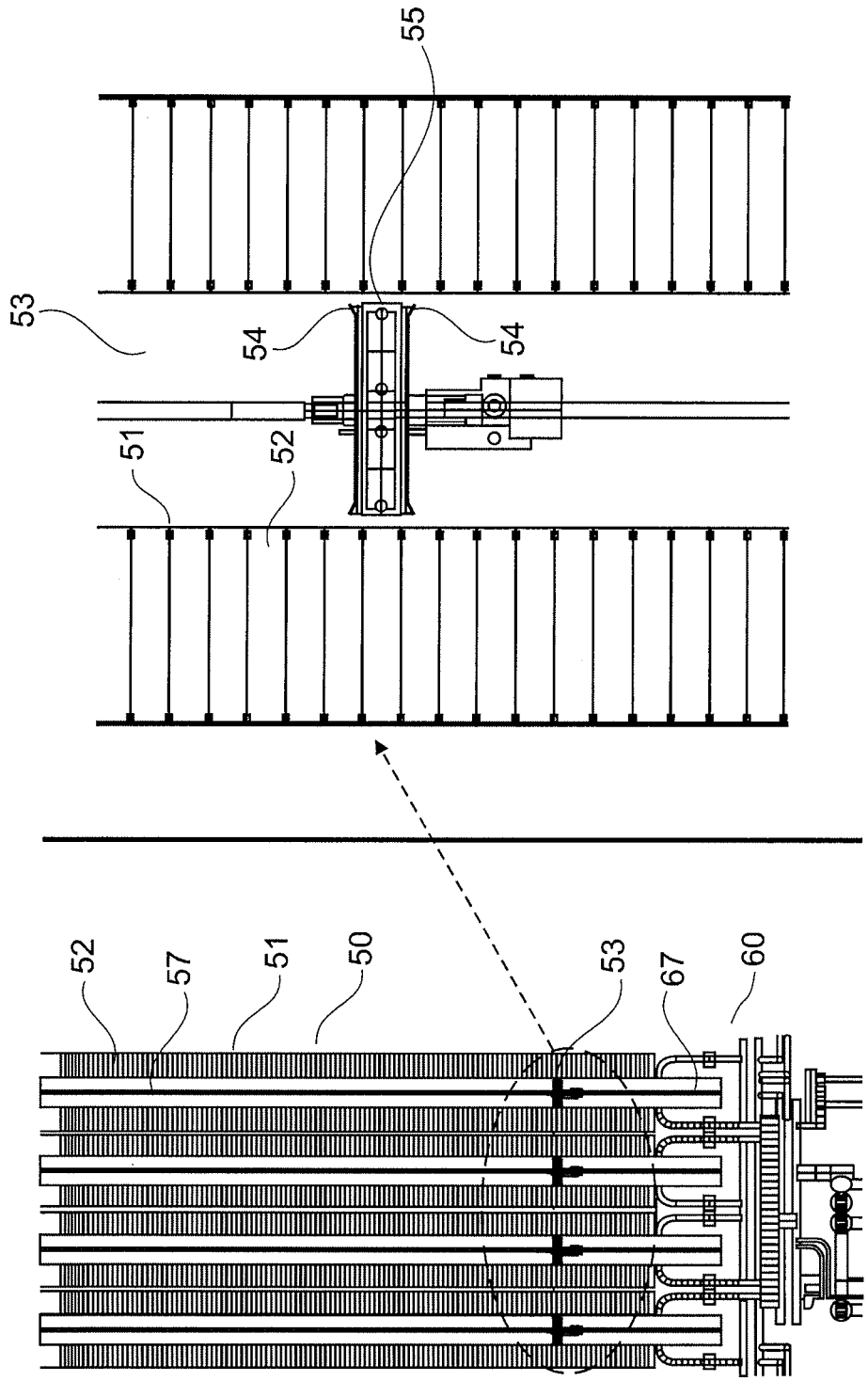
FIG. 6A is a view of the small-parts store and the order-picking apparatus from FIG. 2.
FIG. 6B is a detailed view of the small-parts store with a rack-operating device.

FIGS. 6A and 6B show four small-parts stores 50 as modules with a total of eight racks 51, in which storage locations 52 for the SKUs are arranged on top of and beside each other. The small-parts stores 50 of FIG. 6A comprise four rack-operating devices 53, which can move along transport levels 57, such that all the storage locations 52 can be serviced. The end faces of transport level 57 lead out as the movement level 67 into the area of the order-picking apparatus 60 in order that the individual items may be retrieved. Each individual small-parts store 50 comprises a rack-operating device 53 and two racks 51.

FIG. 6B shows details of how the rack-operating device 53 is arranged relative to the storage locations 52 of the opposite racks 51.

The rack-operating device 53 comprises a telescopic fork 55 with belt conveyor, via which the individual items, such as beverage crates, can be stored in the storage locations 52 and retrieved from them. The rack-operating device 53 can transport a total of ten individual crates simultaneously on the telescopic fork 55 with belt conveyor. To the side of the telescopic fork with belt conveyor 55 are provided centering apparatuses 54 for centering the rows of crates of varying widths.

Figure 7:
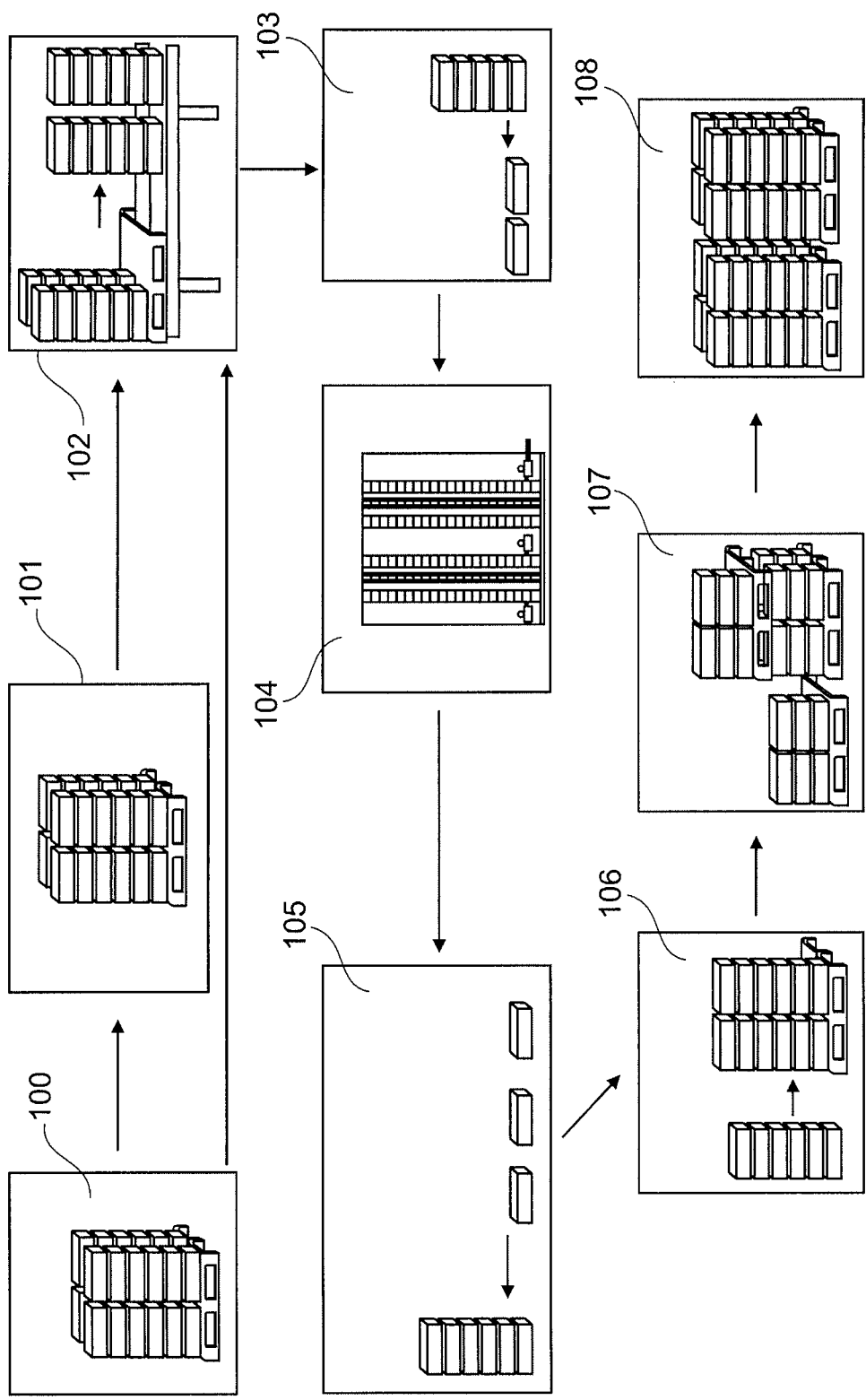
FIG. 7 is a flow diagram for a further embodiment of the invention.

FIG. 7 is a schematic flow diagram for the description of the concept of an aspect of the present invention using an exemplary embodiment.

First, in a receiving area 100, an inbound unit of a supplier with a single-type packaging and shipping unit composed of a plurality of SKUs is received. The inbound unit in this case consists of a pallet stack, which can be stored on a standard Euro pallet.

From the receiving area 100, the inbound unit is forwarded into a pallet storage 101, where it awaits further processing. The pallet storage 101 thus constitutes a buffer for processing. Alternatively, the inbound unit from receiving area 100 can be transferred directly to a depalletizing station 102, where the SKUs are removed from the pallet (i.e., the load carrier). The pallets from the pallet storage 101 can also be delivered to the depalletizing station, which serves as a separating station for forming sub-units (SKU towers).

As may be seen from the illustration in FIG. 7, in the depalletizing station, the SKUs of the inbound unit, which are arranged as adjacent stacks or so-called towers, are separated such that the individual towers are removed from the pallet.

The stacks or towers of SKUs, the so-called sub-units, are transported as a closed unit (e.g., in the form of the towers), to a destacking station 103. Corresponding transport in the form of towers or stacks is also called stack transport. Although in the illustrated embodiment the SKUs are indeed transported as stacks of SKUs arranged on top of each other, so-called stack transport can take place in any other manner (e.g., in the form of a unit of items lying adjacent to each other, and the like).

In the destacking station 103, the stacks of SKUs are divided into individual SKUs that are stored in a small-parts store 104. Since the SKUs in the present embodiment are each arranged individually in containers, such as fresh meat in corresponding containers or trays, the small-parts store 104 can also be called a container store. The small-parts store 104, as indicated in FIG. 7, can be formed as a high rack store with facing pairs of high racks between which a rack vehicle, called a rack-operating device (picking mini-load PML), stores and retrieves the SKUs or the corresponding containers in/from the storage locations of the facing high racks.

In the small-parts store 104 are stored all items which are required for any assembling of an outbound unit. This means all the items which, for example, belong to the range carried by a retail business of a branch store are stored in the corresponding small-parts store 104. Only a few items (e.g., in the order of less than 10% of the entire range of items) can be picked outside of the automated order-picking system, since, in the case of those items from the range which are sold in small volumes or rarely, too much effort would be involved in occupying a storage location in the small-parts store 104 on account of the low demand.

Where an outbound unit is being assembled (i.e., an order is being picked), the corresponding SKUs from the SKUs are retrieved from the small-parts store 104 and transported to a stacking station 105, where the various items are re-assembled back into a stack (i.e., an item tower). A corresponding item stack or tower is then transported to a palletizing station 106, which can also be described as a packaging station, in order that it may be arranged on a corresponding pallet. A further packaging station can provide for pallet stacking, with the double-deck pallets formed here being released into a shipping area 108, where they are accordingly loaded (e.g., onto trucks).

Figure 8:
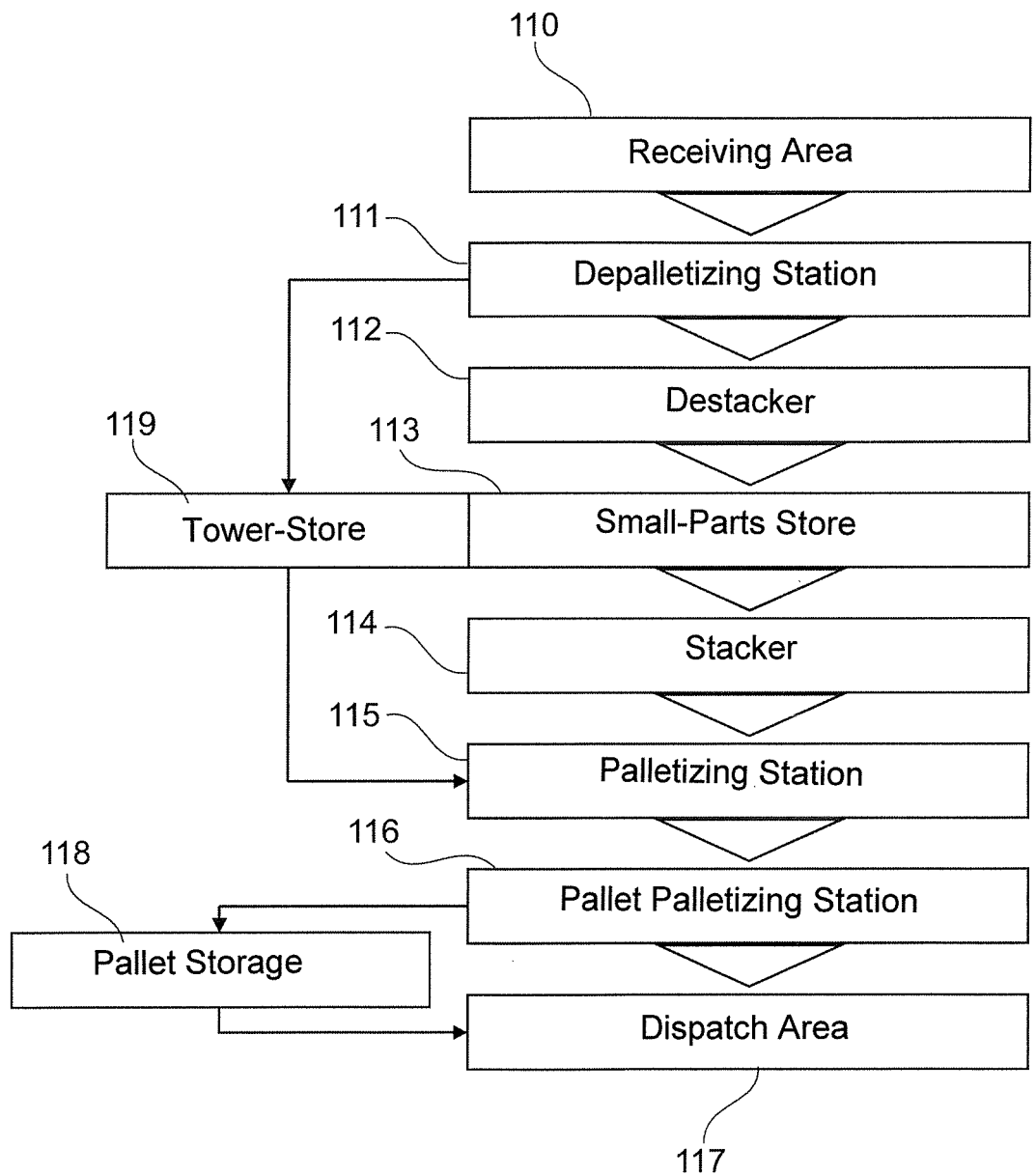
FIG. 8 is a flow diagram for an inventive embodiment.

FIG. 8 describes the basic sequence of the inventive picking method in a schematic flow diagram. After delivered single-type items, stacked on pallets, but also packaged in any other way, have been received at receiving area 110, the inbound unit is divided into individual SKUs or groups of SKUs in a depalletizing station 111. The described embodiment involves separation of the stacks present on the pallet. These are transported further to a corresponding destacker 112 where the stacks are further separated, more precisely into the corresponding SKUs. These are then stored in a small-parts store 113 or container store 113 if the SKUs are items stored in containers. In parallel to this branch, the stacks removed from the pallet can also be stored direct in a so-called tower store 119, in which the stacks are not separated further, but rather the SKUs are transported and stored closed in the stack. Furthermore, it is also possible for further sub-units to be formed (e.g., in the case of destacker 112, the stacks are divided not into individual SKUs, but rather sub-units of towers are retained, which, for example, comprise only half the stack of the SKUs, which were originally arranged in a stack or tower on the pallet).

From the small-parts store 113, in which the SKUs are arranged individually on respective storage locations and whence they can be also be removed, even if, for example, several SKUs are arranged behind each other in several adjacently arranged storage locations, the SKUs are retrieved again in line with an order to assemble an outbound unit, with the SKUs being removed in the sequence in which the SKUs are subsequently stacked on a pallet to form the outbound unit. The sequence of the retrieved SKUs therefore contains, in line with the order to form an outbound unit, the various items that make up the outbound unit. A sequence of items to be retrieved comprises in this regard the number of different SKUs that are needed to form the outbound unit. The SKUs removed from the small-parts store 113 are supplied to a stacker 114, where they are correspondingly stacked to form stacks which can be arranged direct on the pallet of the outbound unit. The stacks are transported to a palletizing station 115, where they can be arranged on a pallet. Instead of a palletizing station, other packaging stations can be provided in which arbitrary sub-units of grouped SKUs can be packaged.

In parallel to the stacking and palletizing of SKUs from the small-parts store 113, complete sub-units (e.g., stacks or towers of single-type SKUs which have been stored there) can be removed from the small-parts store 113, in as far as the order to form the outbound unit contains such a large number of similar SKUs, such that a stack of these items can be formed on the pallet of the outbound unit. Accordingly, destacking and restacking of these items can be dispensed with and the items can be transported from a corresponding tower store 119 direct to the palletizing station 115.

After palletizing station 115, in the illustrated embodiment, the pallets formed are stacked on top of each other to form double-deck pallets. This occurs in the pallet palletizing station 116.

The outbound units formed thereby can be temporarily stored in a corresponding store, such as a pallet storage 118 or transported directly to a dispatch area 117 to be correspondingly loaded and shipped.

Figure 9:
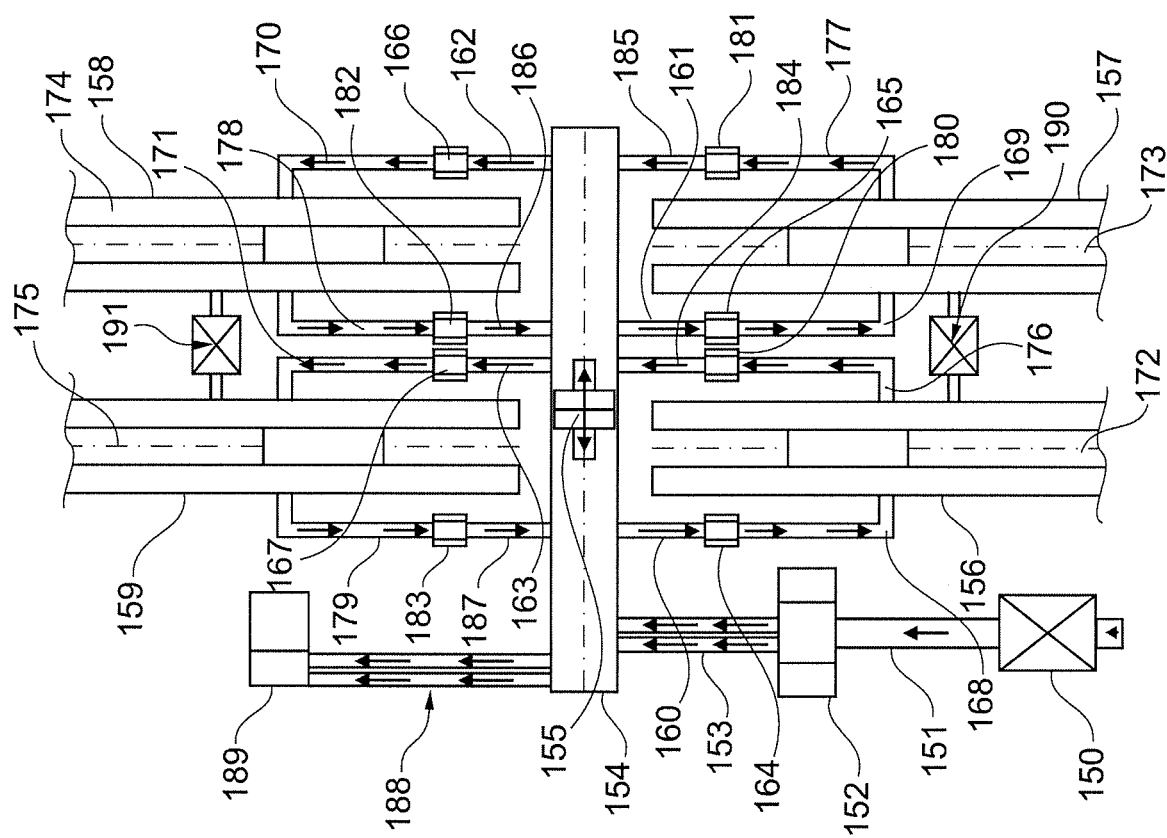
FIG. 9 is a plan view of a further embodiment of an inventive order-picking installation.

FIG. 9 is a schematic plan view of an order-picking installation of the kind that can be designed in accordance with an aspect of the present invention.

The order-picking installation of FIG. 9 comprises a receiving area 150, which can be formed either by a transfer point for pallets from a pallet storage, or can constitute a direct delivery of inbound units, which are delivered (e.g., via trucks and the like). The inbound units which are received at the receiving area 150 are transported via a handling section 151 to a first separation station in the form of a depalletizing station 152, where the SKUs, such as beverage crates or containers with corresponding items or other SKUs, are separated from the transport apparatus, such as a pallet. This can be accomplished for example by a pusher pushing the stacks of SKUs on the pallet from the pallet onto a further handling section 153. The handling section 153 can consist of two parallel or conveyor belts or roll conveyors which transport the stacks or towers of single-type SKUs in the direction of a cross-pusher 154, in which a cross-pushing car 155 can be traversed along a cross-pushing route. The cross-pushing car 155 is designed such that it can simultaneously accommodate in parallel beside each other the stacks which are delivered in two rows on the parallel arranged transport paths of the handling section 153. In the cross-push transverse to the handling section 153, the stacks of single-type items can be transported to four similarly structured modules of the order-picking installation, each of which has a small-parts store 172, 173, 174 and 175. The installation with modules 156, 157, 158 and 159 is composed of two modules facing each other and adjacent to each other in a compact rectangular shape. Each module 156, 157, 158, 159 comprises, apart from a small-parts store 172, 173, 174, 175, each with a rack vehicle (picking mini-load ("PML")), two high racks between which the rack vehicle (PML) can traverse along a transport path so as to be able to operate the two high racks on both sides of the transport path of the rack vehicle PML in order thus to be able to approach all storage locations of the two high racks. In each module 156, 157, 158, 159 are stored all the SKUs which are to be picked by the order-picking installation, that is, which can be potentially contained in an order to form an outbound unit. The SKUs are stored on small-parts store storage locations such that they can be individually stored and retrieved again.

For storage, the SKUs in the form of the stack towers are transported by the cross-pushing car 155 to the respective storage sections 160, 161, 162 and 163 of the modules 156, 157, 158, 159 to be transferred there to the corresponding storage sections 160, 161, 162 and 163.

In each of the storage sections 160, 161, 162, 163 is located a destacker 164, 165, 166, 167, in which the item stacks or towers are separated in the form of a second separating station into corresponding SKUs. Then, on the second part of the storage section 168, 169, 170, 171, they are transported to item-storing positions of the small-parts stores 172, 173, 174, 175, where they are transferred to the respective PML rack vehicle to be stored by it in the corresponding storage locations of the small-parts stores 172, 173, 174 and 175.

Once an order to form an outbound unit is received, the various items that are necessary for forming the outbound unit are retrieved from single small-parts stores 172, 173, 174, 175 via the PML rack vehicles and transferred at the relevant item-retrieval position to respective handling sections 176, 177, 178, 179, on which they are transported to stacking devices 180, 181, 182, 183, where they are again assembled to corresponding tower stores. These stack towers composed of various SKUs are transported via retrieval handling sections 184, 185, 186, 187 to the cross-pushing car 155, which receives the stack towers of various SKUs and transports them onto the stack retrieval section 188, which transports the stack towers for example in two adjacent transport paths to a packaging station in the form a palletizing station 189. There, the final outbound unit composed of several adjacent stack towers of different SKUs is formed on a pallet, which then can then be transported away by, for example, trucks and delivered to the corresponding retail stores of a retail chain.

Between the modules 156 and 157 is provided a module exchange unit 190 and between the small-parts stores 174 and 175 of modules 158 and 159 is provided a module exchange unit 191, which allows SKUs to be exchanged between the different modules. This affords short routes for items which are needed in the case of a module 156, 157, 158, 159, to be fed from another module via a short route.

FIG. 10 shows the configuration and mode of action of a corresponding module exchange apparatus for the example of the module exchange unit 190.

FIG. 10 shows the layout of the two high-rack stores 172 and 173, which have between them the corresponding module exchange unit 190. Since the high-rack stores or small-parts stores 172 and 173 are formed of high-rack stores on top of each other, each with a PML rack vehicle, the module exchange unit 190 is equipped with two horizontal conveyors 192 and 193, which can be brought to the corresponding height of the respective racks by a lifting apparatus in order that SKUs may be exchanged by means of a horizontal push.

FIG. 11 is a further illustration of the sequenced storage of items and especially the sequenced retrieval of the items from the order-picking installation.

In area 200, the inbound units are transported to the order-picking installation to be broken into individual stacks in a depalletizing station 201. In the illustrated embodiment, the stacks are stored in accordance with a transport path 202 in module 157, where they are stored in the small-parts store via the destacker. Storing here is also sequenced, which means one inbound unit is fully stored in one sequence without interruption to the storing process, whereby storing need not necessarily occur in a single module, but rather can be distributed across several modules.

Once the storing sequence is finished, the cross-pushing car 155 is ready for a retrieval sequence, whereby, in the case of the embodiment shown in FIG. 11, a sequenced retrieval of the SKUs from the same module 157 takes place. Sequenced retrieval here means that all items for the purpose of forming an outbound unit are chosen from the same module 157 (i.e., from the small-parts store present there) and are transported in an uninterrupted sequence to a packaging station 204, where, in this example, they are stacked on a pallet. The retrieval sequence along a retrieval transport path 203 occurs here in a single continuous sequence without interruption, even though both continuous and discontinuous materials handling (cross-pushing) is used. Retrieval from the small-parts store is followed first by stacking of the consecutively retrieved SKUs to form stack towers, which are then transported still in the form of stack towers to the palletizing station 204, where the stack towers are pushed onto corresponding pallets to form a full outbound unit in the form of a stacking pallet 205.

The present invention is characterized by the fact that the following features are realized:

1. Method, installation, apparatuses and system for order picking wherein all the items to be handled are stored as SKUs or individual packaging units (smallest packaging unit of single-type items) individually in defined storage locations of a small-parts store and placed from there directly in a picked packaging and shipping unit.
2. Method, installation, apparatuses and system for order picking, wherein items to be handled in a small-parts store are transported on a single transport path without branches, junctions and/or confluences to an apparatus for forming picked packaging or shipping units.
3. Method, installation, apparatuses and system for order picking, wherein all items to be handled are stored in a small-parts store.
4. Method, installation, apparatuses and system for order picking, wherein monitoring of the composition with respect to the identity of the items is done by means of information technology only.
5. Method, installation, apparatuses and system for order picking wherein a sub-unit store (tower store) is provided for storing single-type sub-units of a packaging or shipping unit, said tower store being provided in the sense of materials flow between a pallet storage (store for storing single-type shipping or packaging units) and a small-parts store.
6. Method, installation, apparatuses and system for order picking wherein sub-units of a sub-unit store are transferred both to a small-parts store or direct to an apparatus for the formation of a picked packaging and/or shipping unit.
7. Method, installation, apparatuses and system for order picking wherein the items and/or the item sub-units are monitored by constant electronic storage of their whereabouts and/or their transport paths.
8. Method, installation, apparatuses and system for order picking wherein, for the assembling of packaging or shipping units containing single-type stacks, the electronically stored information on the whereabouts and information about transport actions and storage information on the whereabouts updated after transport actions are used.
9. Method, installation, apparatuses and system for order picking wherein, for the order picking of packaging or shipping units of arbitrary items in retail packages, containers and/or sub-packaging units, no physical identification and/or direct target tracking of the items in the system takes place between a receiving area comprising depalletizing of single-type items and a dispatch area comprising stacking and/or packaging of picked items.

Although the present invention has been described in detail using the embodiments, it is obvious to a person skilled in the art that the invention is not limited to this embodiment, but rather that modifications are possible in which some features can be left out or other combinations of features can be made, without departing from the protective scope of the attached claims.

I claim:

1. An order-picking system for fully automated repacking of stock-keeping units from an inbound unit having a plurality of identical stock-keeping units to an outbound unit having a plurality of different stock-keeping units, wherein the order-picking system comprises a number of different stock-keeping units to be handled by the system and an order-picking installation comprising:
    a separating station for separating the stock-keeping units, which are delivered in the inbound unit composed of the plurality of identical stock-keeping units, into at least one of stock-keeping units and sub-units of several stock-keeping units;
    a small-parts store, in which is provided a storage location for each type of stock-keeping unit of the number of different stock-keeping units, with an item-storing position and an item-retrieval position, wherein the small-parts store is formed as a high rack store;
    a store-operating device being located in the small-parts store for moving between the storage locations and the item-storing position or the item-retrieval position, wherein the store-operating device is formed as a rack vehicle moving between racks of the high rack store so that all storage locations of the high rack store having stored the whole number of different stock-keeping units can be reached by a single rack vehicle; and
    at least one of a stacking and packaging station for assembling at least one of different stock-keeping units and sub-units in the outbound unit;
    wherein, between the separating station and the item-storing position is provided a first handling section, and between the item-retrieval position and the at least one of a stacking and packaging station is provided a second handling section, wherein at least the small-parts store, the second handling section, and the at least one stacking and packaging station are configured such that the stock-keeping units or sub-units of several stock-keeping units are guided with indirect target tracking such that stock-keeping units or sub-units of several stock-keeping units are moved along a travel route from the item-retrieval position to the at least one stacking and packaging station without requiring any direct identification of the stock-keeping units or sub-units of several stock-keeping units anywhere along the travel route.

2. The order-picking installation in accordance with claim 1, wherein:
    at least one of the first and second handling sections has no junction, confluence or crossing points.

3. The order-picking installation in accordance with claim 1, wherein:
    at least one of the first and second handling sections has a length of less than or equal to 15 m.

4. The order-picking installation in accordance with claim 1, wherein:
    the indirect target tracking contains purely informational item tracking.

5. The order-picking installation in accordance with claim 1, wherein:
    the stock-keeping units are moved under application of indirect target tracking with purely informational item tracking.

6. The order-picking installation in accordance with claim 1, wherein:
    the order-picking installation comprises several modules, wherein each module comprises the small-parts store, the separating station and the at least one of the stacking and packaging station.

7. The order-picking installation in accordance with claim 6, wherein:
    several modules with their own stacking stations have a common packaging station.

8. The order-picking installation in accordance with claim 1, wherein:
    a sub-unit store is provided in which single-type sub-units composed of several identical stock-keeping units are stored.

9. The order-picking installation in accordance with claim 8, further including:
    a third handling section which connects the sub-units store with at least one of the separating station and the small-parts store.

10. The order-picking installation in accordance with claim 8, further including:
    a fourth handling section which connects the sub-unit store to the packaging station.

11. An order-picking system for fully automated repacking of stock-keeping units from an inbound unit having a plurality of identical stock-keeping units to an outbound unit having a plurality of different stock-keeping units, wherein the system comprises a number of different stock-keeping units to be handled by the system and an order-picking installation comprising:
    a separating station for separating the stock-keeping units, which are delivered in an inbound unit composed of the plurality of identical items, into at least one of stock-keeping units and sub-units of several stock-keeping units;
    a small-parts store, in which is provided a storage location for each type of stock-keeping unit of the number of different stock-keeping units, with an item-storing position and an item-retrieval position, wherein the small-parts store is formed as high rack store;
a store-operating device being located in the small-parts store for moving between the storage locations and the item-storing position or the item-retrieval position, wherein the store-operating device is formed as a rack vehicle moving between racks of the high rack store so that all storage locations of the high rack store having stored the whole number of different stock-keeping units can be reached by a single rack vehicle;
a sub-units store adapted for storing several single-type sub-units composed of several stock-keeping units; and
at least one of a stacking and packaging station for assembling different stock-keeping units in the outbound unit;
wherein the installation is configured such that assembly of the outbound unit can occur not only direct with sub-units from the sub-units store, but also with stock-keeping units from the small-parts store; and
wherein, between the separating station and the item-storing position is provided a first handling section, and between the item-retrieval position and the at least one of a stacking and packaging station is provided a second handling section, wherein at least the small-parts store, the second handling section, and the at least one stacking and packaging station are configured such that the stock-keeping units or sub-units of several stock-keeping units are guided with indirect target tracking such that stock-keeping units or sub-units of several stock-keeping units are moved along a travel route from the item-retrieval position to the at least one stacking and packaging station without requiring any direct identification of the stock-keeping units or sub-units of several stock-keeping units anywhere along the travel route.

12. The order-picking installation in accordance with claim 11, further including:
a third handling section which connects the sub-units store with at least one of the separating station and the small-parts store.

13. The order-picking installation in accordance with claim 11, further including:
a fourth handling section which connects the sub-unit store to the packaging station.

14. A method for fully automated repacking of stock-keeping units from an inbound unit having a plurality of identical stock-keeping units into an outbound unit having a plurality of different stock-keeping units in an order-picking system, wherein the method comprises:
providing a number of different stock-keeping units to be handled in the order-picking system;
providing an order-picking installation, wherein the order-picking installation comprises:
a separating station for separating the stock-keeping units, which are delivered in the inbound unit composed of the plurality of identical stock-keeping units, into at least one of stock-keeping units and sub-units of several stock-keeping units;
a small-parts store, in which is provided a storage location for each type of stock-keeping unit of the number of different stock-keeping units, with an item-storing position and an item-retrieval position, wherein the small-parts store is formed as high rack store;
a store-operating device being located in the small-parts store for moving between the storage locations and the item-storing position or the item-retrieval position, wherein the store-operating device is formed as a rack vehicle moving between racks of the high rack store so that all storage locations of the high rack store having stored the whole number of different stock-keeping units can be reached by a single rack vehicle; and
at least one of a stacking and packaging station for assembling at least one of different stock-keeping units and sub-units in the outbound unit;
wherein, between the separating station and the item-storing position is provided a first handling section, and between the item-retrieval position and the at least one of a stacking and packaging station is provided a second handling section, wherein at least the small-parts store, the second handling section, and the at least one stacking and packaging station are configured such that the stock-keeping units or sub-units of several stock-keeping units are guided with indirect target tracking such that stock-keeping units or sub-units of several stock-keeping units are moved along a travel route from the item-retrieval position to the at least one stacking and packaging station without requiring any direct identification of the stock-keeping units or sub-units of several stock-keeping units anywhere along the travel route;
separating a delivered inbound unit composed of a plurality of identical items into stock-keeping units;
storing the stock-keeping units in a small-parts store in which a storage location is provided for each kind of stock-keeping unit;
retrieving the stock-keeping units from the small-parts store for forming the outbound unit in a sequence until the outbound unit is finished; and
assembling the sequence of different stock-keeping units in the outbound unit.

15. The method in accordance with claim 14, wherein:
separating also comprises separating the delivered inbound unit composed of the plurality of identical items into at least one sub-unit composed of several stock-keeping units; and
assembling the sequence of different stock-keeping units comprises assembling the sub-units from a sub-units store in the outbound unit.

16. The method in accordance with claim 15, wherein:
separating takes place at a separation station;
assembling takes place at an assembling station; and
further including transporting the sub-units composed of several stock-keeping units from the separation station to the assembling station without further separating at least one of the sub-units composed of several stock-keeping units.

17. The method in accordance with claim 14, further including:
transporting partially assembled stock-keeping units.

18. A method for fully automated repacking of stock-keeping units from an inbound unit having a plurality of identical stock-keeping units into an outbound unit having a plurality of different stock-keeping units in an order picking system, wherein the method comprises:
providing a number of different stock-keeping units to be handled in the order picking system;
providing an order-picking installation, wherein the order-picking installation comprises:
a separating station for separating the stock-keeping units, which are delivered in an inbound unit composed of the plurality of identical items, into at least one of stock-keeping units and sub-units of several stock-keeping units;
a small-parts store, in which is provided a storage location for each type of stock-keeping unit of the number of different stock-keeping units, with an item-storing position and an item-retrieval position, wherein the small-parts store is formed as high rack store;

a store-operating device being located in the small-parts store for moving between the storage locations and the item-storing position or the item-retrieval position, wherein the store-operating device is formed as a rack vehicle moving between racks of the high rack store so that all storage locations of the high rack store having stored the whole number of different stock-keeping units can be reached by a single rack vehicle;

a sub-units store adapted for storing several single-type sub-units composed of several stock-keeping units; and at least one of a stacking and packaging station for assembling different stock-keeping units in the outbound unit;

wherein the installation is configured such that assembly of the outbound unit can occur not only direct with sub-units from the sub-units store, but also with stock-keeping units from the small-parts store;

separating a delivered inbound unit composed of a plurality of identical items into at least one of stock-keeping units and sub-units composed of several stock-keeping units;

storing the stock-keeping units in a small-parts store in which a storage location is provided for each kind of stock-keeping unit;

retrieving the stock-keeping units from the small-parts store for forming the outbound unit;

assembling at least one of different stock-keeping units and sub-units into an outbound unit;

wherein separating takes place at a separation station and assembling takes place at an assembling station; and transporting the sub-units composed of several stock-keeping units from the separation station to the assembling station without further separating at least one of the sub-units composed of several stock-keeping units;

wherein, between the separating station and the item-storing position is provided a first handling section, and between the item-retrieval position and the at least one of a stacking and packaging station is provided a second handling section, wherein at least the small-parts store, the second handling section, and the at least one stacking and packaging station are configured such that the stock-keeping units or sub-units of several stock-keeping units are guided with indirect target tracking such that stock-keeping units or sub-units of several stock-keeping units are moved along a travel route from the item-retrieval position to the at least one stacking and packaging station without requiring any direct identification of the stock-keeping units or sub-units of several stock-keeping units anywhere along the travel route.

19. The method in accordance with claim 18, further including:

transporting partially assembled stock-keeping units.

20. The order-picking installation in accordance with claim 1, wherein:

the small-parts store has a single item-retrieval position.

21. The order-picking installation in accordance with claim 1, wherein the stock-keeping units have no identification markings used in the order-picking installation for identifying the stock-keeping units.

22. The order-picking installation in accordance with claim 1, wherein all stock-keeping units for assembly of the outbound unit are held in stock in said small-parts store in which a storage location is provided for each kind of stock-keeping unit.

* * * * *